United States Patent
Cossairt et al.

(10) Patent No.: US 10,694,123 B2
(45) Date of Patent: Jun. 23, 2020

(54) SYNTHETIC APERTURES FOR LONG-RANGE, SUB-DIFFRACTION LIMITED VISIBLE IMAGING USING FOURIER PTYCHOGRAPHY

(71) Applicants: Northwestern University, Evanston, IL (US); William Marsh Rice University, Houston, TX (US)

(72) Inventors: Oliver Strider Cossairt, Evanston, IL (US); Jason Holloway, Houston, TX (US); Ashok Veeraraghavan, Houston, TX (US); Manoj Kumar Sharma, Houston, TX (US); Yicheng Wu, Houston, TX (US)

(73) Assignees: Northwestern University, Evanston, IL (US); William Marsh Rice University, Houston, TX (US)

( * ) Notice: Subject to any disclaimer, the term of this patent is extended or adjusted under 35 U.S.C. 154(b) by 82 days.

(21) Appl. No.: 16/035,629

(22) Filed: Jul. 14, 2018

(65) Prior Publication Data
US 2020/0150266 A1    May 14, 2020

Related U.S. Application Data

(60) Provisional application No. 62/532,637, filed on Jul. 14, 2017.

(51) Int. Cl.
*H04N 5/228* (2006.01)
*H04N 5/357* (2011.01)
(Continued)

(52) U.S. Cl.
CPC ........... *H04N 5/357* (2013.01); *H04N 1/3216* (2013.01); *H04N 5/213* (2013.01); *H04N 5/217* (2013.01)

(58) Field of Classification Search
CPC ...... H04N 1/3216; H04N 5/213; H04N 5/217; H04N 5/357
(Continued)

(56) References Cited

U.S. PATENT DOCUMENTS

2002/0043561 A1*   4/2002   Tsikos ................... B82Y 15/00
                                                              235/454

OTHER PUBLICATIONS

D. L. Fried, "Optical resolution through a randomly inhomogeneous medium for very long and very short exposures," JOSA., vol. 56, No. 10, pp. 1372-1379, Oct. 1966.
(Continued)

*Primary Examiner* — Usman A Khan
(74) *Attorney, Agent, or Firm* — Bell & Manning, LLC

(57) ABSTRACT

A method for imaging objects includes illuminating an object with a light source of an imaging device, and receiving an illumination field reflected by the object. An aperture field that intercepts a pupil of the imaging device is an optical propagation of the illumination field at an aperture plane. The method includes receiving a portion of the aperture field onto a camera sensor, and receiving a sensor field of optical intensity. The method also includes iteratively centering the camera focus along the Fourier plane at different locations to produce a series of sensor fields and stitching together the sensor fields in the Fourier domain to generate an image. The method also includes determining a plurality of phase information for each sensor field in the series of sensor fields, applying the plurality of phase information to the image, receiving a plurality of illumination fields reflected by the object, and denoising the intensity of plurality of illumination fields using Fourier ptychography.

9 Claims, 10 Drawing Sheets

(51) Int. Cl.
H04N 1/32 (2006.01)
H04N 5/213 (2006.01)
H04N 5/217 (2011.01)

(58) Field of Classification Search
USPC .................................................. 348/222.1
See application file for complete search history.

(56) References Cited

OTHER PUBLICATIONS

D. Korff, "Analysis of a method for obtaining near-diffraction-limited information in the presence of atmospheric turbulence," JOSA., vol. 63, No. 8, pp. 971-980, Aug. 1973.
Miller, et al., "Comparison of methods for processing short-exposure data from large telescopes*," Astrophys. J., vol. 186, pp. L91-L93, Dec. 1, 1973.
K. T. Knox et al., "Recovery of images from atmospherically degraded short-exposure photographs," Astrophys. J., vol. 193, pp. L45-L48, Oct. 1, 1974.
J. W. Hardy, "Active optics: a new technology for the control of light," Proc. IEEE., vol. 66, No. 6, pp. 651-697, Jun. 1978.
J. Y. Wang, et al., "Modal compensation of atmospheric turbulence phase distortion*,". JOSA., vol. 68, No. 1, pp. 78-87, Jan. 1978.
T. R. Hillman, et al., "High-resolution, Wide-field Object Reconstruction with Synthetic Aperture Fourier Holographic Optical Microscopy," Opt. Express, vol. 17, No. 10, pp. 7873-7892, May 11, 2009.
Martinez-León, et al., "Synthetic Aperture Single-Exposure On-Axis Digital Holography," Opt. Express, vol. 16, No. 1, pp. 161-169, Jan. 7, 2008.
J. H. Massig, "Digital Off-Axis Holography with a Synthetic Aperture," Opt. Lett., vol. 27, No. 24, pp. 2179-2181, Dec. 15, 2002.
V. Mico, et al., "Synthetic aperture superresolution with multiple off-axis holograms,". J. Opt. Soc. Am. A., vol. 23, No. 12, pp. 3162-3170, Dec. 2006.
A. E. Tippie, et al., High-resolution synthetic-aperture digital holography with digital phase and pupil correction, Opt. Express, vol. 19, No. 13, pp. 12027-12038, Jun. 20, 2011.
S. Baker, et al., "Limits on Super-resolution and How to Break Them," Pattern Anal. Mach. Intell. IEEE Trans, vol. 24, No. 9, pp. 1167-1183, Sep. 2002.
Z. Lin, et al., Fundamental Limits of Reconstruction-based Super-resolution Algorithms Under Local Translation, Pattern Anal. Mach. Intell. IEEE Trans, vol. 26, No. 1, pp. 83-97, Jan. 2004.
P. Milanfar, Ed., Super-Resolution Imaging (CRC Press, 2010), pp. 1-10.
W. T. Freeman, et al., "Example-based Super-resolution," Comput. Graph. Appl. IEEE, vol. 22, pp. 56-65, Mar./Apr. 2002.
D. Glasner, et al., "Super-Resolution from a Single Image," in Computer Vision, 2009 IEEE 12th International Conference on (2009), pp. 349-356.
Zheng, et al., "Wide-field, High-resolution Fourier Ptychographic Microscopy,". Nat. Photonics., vol. 7, No. 9, pp. 739-745, Sep. 1, 2013.
Ou, et al., "Embedded Pupil Function Recovery for Fourier Ptychographic Microscopy," Opt. Express., vol. 22, No. 5, pp. 4960-4972, Mar. 10, 2014.
R. Horstmeyer, et al., "Overlapped Fourier Coding for Optical Aberration Removal," Opt. Express., vol. 22, No. 20, pp. 24062-24080, Oct. 6, 2014.
S. Dong et al., "Aperture-Scanning Fourier Ptychography for 3D Refocusing and Super-resolution Macroscopic Imaging," Opt. Express., vol. 22, No. 11, pp. 13586-13599, Jun. 2, 2014.
P. Li, et al., "Separation of Three-Dimensional Scattering Effects in Tilt-Series Fourier Ptychography," Ultramicroscopy, vol. 158, pp. 1-7, 2015.
L. Tian, et al., "3D Intensity and Phase Imaging from Light Field Measurements in an LED Array Microscope," Optica., vol. 2, No. 2, pp. 104-111, Feb. 2015.

R. Horstmeyer, et al., "Diffraction tomography with Fourier ptychography," Optica., vol. 3, No. 8, pp. 827-835, Aug. 2016.
S. Dong, et al., "Spectral Multiplexing and Coherent-State Decomposition in Fourier Ptychographic Imaging," Biomed. Opt. Express., vol. 5, No. 6, pp. 1757-1767, Jun. 1, 2014.
L. Tian, et al., "Multiplexed Coded Illumination for Fourier Ptychography with an LED Array Microscope," Biomed. Opt. Express., vol. 5, pp. 2376-2389, 2014.
S. Dong, et al., "Sparsely sampled Fourier ptychography," Opt. Express., vol. 22, No. 5, pp. 5455-5464, Mar. 10, 2014.
K. Guo, et al., "Optimization of Sampling Pattern and the Design of Fourier Ptychographic Illuminator," Opt. Express., vol. 23, No. 5, pp. 6171-6180, Mar. 9, 2015.
R. W. Gerchberg, et al., "A Practical Algorithm for the Determination of Phase from Image and Diffraction Plane Pictures," Optik (Stuttg), vol. 35, No. 2, pp. 237-246, 1972.
J. R. Fienup, "Phase Retrieval Algorithms: A Comparison," Appl. Opt., vol. 21, No. 15, pp. 2758-2769, Aug. 1, 1982.
A. M. Maiden, et al., "An Improved Ptychographical Phase Retrieval Algorithm for Diffractive Imaging," Ultramicroscopy, vol. 109, pp. 1256-1262, 2009.
L.-H. Yeh, et al., "Experimental robustness of Fourier ptychography phase retrieval algorithms," Opt. Express., vol. 23, No. 26, pp. 33214-33240, Dec. 28, 2015.
J. Holloway, et al., "Toward Long-Distance Subdiffraction Imaging Using Coherent Camera Arrays," IEEE Trans. Comput. Imaging, vol. 2, No. 3, pp. 251-265, Sep. 2016.
B. Salahieh, thesis, "Reflective Mode Fourier Ptychography," University of Arizona, pp. 1-28, 2015.
S. Pacheco, et al., "Reflective Fourier ptychography," J. Biomed. Opt., vol. 21, No. 2, pp. 026010-026010-6, Feb. 2016.
X. Ou, et al., Aperture scanning Fourier ptychographic microscopy, Biomed. Opt. Express., vol. 7, No. 8, pp. 3140-3150, Aug. 1, 2016.
S. M. Beck, et al., "Synthetic-aperture imaging laser radar: laboratory demonstration and signal processing," Appl. Opt., vol. 44, No. 35, pp. 7621-7629, Dec. 10, 2005.
J. W. Goodman, "Introduction to Fourier optics," Roberts and Company Publishers, pp. 1-10, 2005.
R. W. Gerchberg, "Super-resolution Through Error Energy Reduction," J. Mod. Opt., vol. 21, No. 9, pp. 709-720, 1974.
J. R. Fienup, "Reconstruction of an Object From the Modulus of Its Fourier Transform," Opt. Lett., vol. 3, No. 1, pp. 27-29, Jul. 1978.
J. M. Rodenburg, et al., "A phase retrieval algorithm for shifting illumination," Appl. Phys. Lett., vol. 85, pp. 4795-4797, 2004.
B. M. Oliver, "Sparkling spots and random diffraction," Proc. IEEE., vol. 51, pp. 220-221, 1963.
D. Rigden, et al., "The Granularity of Scattered Optical Maser Light," Proc. IRE., vol. 50, pp. 2367-2368, Jul. 1962.
J.C. Dainty, et al., in "Laser Speckle and Related Phenomena," (Springer Berlin Heidelberg, Berlin, Heidelberg, 1975; http://dx.doi.org/10.1007/BFb0111440), pp. 1-291.
T. S. McKechnie, "Image-plane speckle in partially coherent illumination," Opt. Quantum Electronics, vol. 8, pp. 61-67, 1976.
K. Dabov, et al., Image Denoising by Sparse 3-D Transform-Domain Collaborative Filtering, Image Process. IEEE Trans., vol. 16, No. 8, pp. 2080-2095, Aug. 2007.
D. L. Donoho, et al., "Ideal spatial adaptation by wavelet shrinkage," Biometrika, vol. 81, No. 3, pp. 425-455, 1994.
D. L. Donoho, et al., "Adapting to unknown smoothness via wavelet shrinkage," J. Am. Stat. Assoc., vol. 90, No. 432, pp. 1200-1224, 1995.
V. Elser, "Phase Retrieval by Iterated Projections," JOSA A, vol. 20, No. 1, pp. 40-55, Jan. 2003.
S. Kubota, et al., "Very efficient speckle contrast reduction realized by moving diffuser device," Appl. Opt., vol. 49, No. 23, pp. 4385-4391, Aug. 10, 2010.
J. M. Artigas, et al., "Contrast sensitivity of the visual system in speckle imagery," JOSA A., vol. 11, No. 9, pp. 2345-2349, Sep. 1994.
D. Gabor, "A New Microscopic Principle," Nature, vol. 161, pp. 777-778, May 15, 1948.

(56) References Cited

OTHER PUBLICATIONS

M. K. Kim, "Principles and techniques of digital holographic microscopy," J. Photonics Energy, vol. 1, pp. 018005-1-018005-50, 2010.

A. Papoulis, "A New Algorithm in Spectral Analysis and Band-Limited Extrapolation," Circuits Syst. IEEE Trans., vol. CAS-22, No. 9, pp. 735-742, Sep. 1975.

A. Zomet, et al., "Robust Super-Resolution," in Computer Vision and Pattern Recognition, 2001. Proceedings of the 2001 IEEE Computer Society Conference on (2001), vol. 1, pp. I-645-I-650.

T. Q. Pham, et al., "Robust Fusion of Irregularly Sampled Data Using Adaptive Normalized Convolution," EURASIP J. Adv. Signal Process., vol. 2006, Article ID 83268, pp. 1-12, 2006.

P. Vandewalle, et al., "A Frequency Domain Approach to Registration of Aliased Images with Application to Super-resolution," EURASIP J. Adv. Signal Process., vol. 2006, Article ID 71459, pp. 1-15, 2006.

A. I. Kirkland, et al., « Multiple beam tilt microscopy for super resolved imaging, J. Electron Microsc. (Tokyo), vol. 46, No. 1, pp. 11-22, 1997.

A. I. Kirkland, et al., "Super-resolution by aperture synthesis: tilt series reconstruction in CTEM.," Ultramicroscopy, vol. 57, pp. 355-374, 1995.

P. Li, et al., "Ptychographic inversion via Wagner distribution deconvolution: Noise suppression and probe design," Ultramicroscopy, vol. 147, pp. 106-113, 2014.

J. M. Rodenburg, et al., "The theory of super-resolution electron microscopy via Wigner-distribution deconvolution," Philos. Trans. R. Soc. London A., vol. 339, pp. 521-553, 1992.

R. Horstmeyer, et al., A phase space model of Fourier ptychographic microscopy, Opt. Express., vol. 22, No. 1, pp. 338-358, Jan. 13, 2014.

R. Horstmeyer, et al., "Standardizing the resolution claims for coherent microscopy," Nat. Photonics., vol. 10, pp. 68-71, Feb. 2016.

\* cited by examiner

Synthetic aperture radar (SAR)

SAVI image acquisition

SAVI generation using Fourier Ptychography

Fingerprint on glass (dusted)

Reverse side of US $2 bill

SYNTHETIC APERTURES FOR LONG-RANGE, SUB-DIFFRACTION LIMITED VISIBLE IMAGING USING FOURIER PTYCHOGRAPHY

CROSS-REFERENCE TO RELATED APPLICATIONS

This application incorporates by reference and claims the benefit of priority to U.S. Provisional Patent Application No. 62/532,637 filed Jul. 14, 2017.

STATEMENT REGARDING FEDERALLY SPONSORED RESEARCH OR DEVELOPMENT

This invention was made with government support under CCF1117939, CCF1527501, CNS1338099, U.S. Pat. Nos. 1,116,718, and 1,453,192 awarded by the National Science Foundation; and HR0011-16-C-0028 awarded by the Defense Advanced Research Projects Agency (DARPA); N00014-14-1-0741 (Subcontract GG010550 from Columbia University) and N00014-15-1-2735 awarded by the Office of Naval Research. The government has certain rights in the invention.

BACKGROUND OF THE INVENTION

The present subject matter relates generally to synthetic apertures for visible imaging. More specifically, the present invention relates to synthetic apertures for visible imaging as a promising approach to achieve sub-diffraction resolution in long distance imaging.

Imaging objects from large standoff distances is a requirement in many computer vision and imaging applications such as surveillance and remote sensing. In these scenarios, the imaging device is sufficiently far away from the object that imaging resolution is fundamentally limited not by magnification, but rather by the diffraction of light at the limiting aperture of the imaging system: using a lens with a larger aperture will lead to increased spatial resolution. Physically increasing the aperture of the lens, by building a larger lens, results in expensive, heavy, and bulky optics and mechanics. A number of techniques have been proposed to improve spatial resolution for various imaging systems, including refractive telescopes (1-6), holography (7-11) and incoherent super-resolution (12-16).

The resolution of an imaging system is proportional to both the lens aperture size and the wavelength of the electromagnetic spectrum used. In long wavelength regimes (such as radar), the direct coupling between image resolution and aperture size can be mitigated using synthetic aperture radar (SAR) techniques. SAR improves radio imaging resolution by capturing multiple measurements of a static object using a mobile recording platform, such as an airplane or satellite as shown in the diagram of FIG. 1A. For SAR, the resolution is determined by the synthetic aperture size, which can be many orders of magnitude larger than the physical aperture size. Stitching together multiple radar returns is possible because the full complex field (amplitude and phase) is directly measured by the antenna with picosecond timing resolution.

As noted above, stitching together multiple radar returns from a SAR technique is possible because the amplitude and phase is measured with picosecond timing resolution. To make a comparable measurement using visible light, a detector would have to continuously record information with a time resolution greater than one femtosecond, a requirement well beyond the capabilities of modern devices. As such, current camera sensors record only the intensity of the incoming optical field and all phase information is lost.

Fourier ptychography (FP) has emerged as a powerful tool to improve spatial resolution in microscopy. In FP, multiple low-resolution images under different illumination angles are captured and stitched together (17-27). Redundancy between measurements permits computational recovery of the missing phase information (18,25, 28-31). Fourier ptychography creates a synthetic aperture by sampling a diverse set of regions in Fourier space. Unlike holography, FP does not require the use of a reference beam to encode phase information. The phase of the complex field is recovered computationally in post-processing. FP has found much of its success in microscopy. Early efforts by Kirkland et al. (59, 60) demonstrated that multiple images recorded with different incident beam tilts could be used to effectively double image resolution. Zheng et al. (17) provided a complete framework for FP microscopy and demonstrated wide-field, high-resolution imaging. Subsequent research has improved the quality of FP reconstructions by characterizing the pupil function (18), digitally removing optical aberrations (19), and refocusing the recovered image post-capture (20). FP microscopy (where the illumination direction is varied) inherently assumes that the sample may be modeled as a thin object. Extensions for thick biological samples (21-23) have been proposed at the expense of increased computational complexity.

At the heart of FP is the requirement to recover the phase of the light field at the aperture plane of the lens, which subsequently provides knowledge of the field at the object plane. Phase retrieval is also an important step in standard and many of the techniques used in FP are borrowed from these earlier efforts.

In general, closed form solutions for recovering phase information require prohibitively large datasets to be practical (61-63). Iterative solutions are thus preferred for ptychographic reconstruction. Many FP reconstruction algorithms are based on the iterative update schemes first proposed by Gerchberg and Saxton (28) and Fienup (29). Maiden and Rodenburg (30) introduced the ePIE technique to jointly estimate the field at the detector and the probe used for illumination. Ou et al. (18) adapted ePIE for use in FP whereby the pupil function is jointly estimated with the field at the aperture plane. Experimental robustness of various phase retrieval algorithms were characterized by Yeh et al. (31) who conclude that minimizing the error in amplitude and using second-order gradient descent methods provide the best results. The phase retrieval algorithm used by Tian et al. (25), which incorporates the pupil update step of (18) and uses the second-order Newton's method as the numerical solver, serves as the base of our proposed algorithm. Although the objective function of the reconstruction framework in (25) minimizes intensities and not amplitudes, our experiments have resulted in good reconstruction quality.

Adapting the technique to long-distance imaging requires two important modifications of previous FP microscopy implementations. First, the separation distance between object and camera increases by orders of magnitude. Second, a reflection imaging geometry must be used so that illumination source and camera are placed on the same side of the object. Dong et al. (20) and Holloway et al. (32) succeeded in the first task, scaling up the working distance to 0.7 and 1.5 meters, respectively. Reflective FP microscopy setups have been proposed to fulfill the second task (33-35). However, these systems either require small working distances (34, 35), or exhibit limited reconstruction performance (33).

In FIGS. 1B and 1C, a comparison with existing FP implementations is shown. Previous works have relied on smooth objects and are loosely represented by the transmissive dataset adapted from (32) shown in FIG. 1B. An example dataset of a diffuse object collected in a reflection mode geometry is shown in FIG. 1C. The immediate difference between the two datasets is the random phase associated with diffuse objects effectively spreads out information across the entire Fourier domain. The difference in Fourier patterns is evident in the captured images taken from the same locations in both modalities. As a consequence of the random phase, the spatial information is obfuscated by the resultant speckle.

Tippie et al. (11) proposes a synthetic aperture holographic setup in which the authors experimentally demonstrated synthetic aperture off-axis holographic capture of diffuse objects at a large stand-off distance. Our approach can be interpreted as a reference-free extension of synthetic aperture holography in which computational reconstruction algorithms are used in place of interferometric capture, resulting in more stable implementations and widening the variety of application scenarios that could benefit from the approach. Beck et al. (36) proposes an optical synthetic aperture approach that extends SAR techniques into optical wavelengths in the near-infrared regime of the electromagnetic spectrum. To record phase measurements, the object is raster scanned by moving an aperture. The return signal is then demodulated using a reference signal to reduce the frequency to approximately 100 kHz, which can be sampled with commercially available ADCs.

BRIEF SUMMARY OF THE INVENTION

The present application discloses a method for imaging objects using macroscopic Fourier ptychography (FP) as a practical means of creating a synthetic aperture for visible imaging to achieve sub-diffraction limited resolution. Also disclosed is a novel image space denoising regularization to reduce the effects of speckle and improve perceptual quality of the recovered high-resolution image, resulting in a 6× improvement in image resolution.

In one embodiment, a method for imaging objects includes the steps of providing an imaging device including a camera sensor, a camera lens, and a pupil; illuminating an object with the light source; receiving an illumination field reflected by the object, wherein an aperture field that intercepts the pupil of the imaging system is an optical propagation of the illumination field at an aperture plane; receiving a portion of the aperture field onto a camera sensor; receiving a sensor field of optical intensity on the image sensor, wherein the sensor field is a Fourier transform of the aperture field immediately after the camera lens; iteratively centering the camera focus along the Fourier plane at different locations to produce a series of sensor fields; stitching together the sensor fields in the Fourier domain to generate an image; determining a plurality of phase information for each sensor field in the series of sensor fields; applying the plurality of phase information to the image; receiving a plurality of illumination fields reflected by the object; and denoising the intensity of plurality of illumination fields using Fourier ptychography.

In a further embodiment the optical propagation is one of a Fourier transform, a Fresnel transform, an angular spectrum propagation, and a Huygens convolution. In a yet further embodiment, the object includes an optically rough surface such that the illumination fields of the plurality of illumination fields are out of phase, creating speckle.

In another embodiment, the method further includes the step of utilizing Fourier ptychography to reduce speckle by increasing the aperture diameter and/or the step of inserting a rotating diffuser in an optical path before the object to reduce diffraction blur. Further, the method may include the step of generating a grid of images to yield a synthetic aperture. In some embodiments, a synthetic aperture of at least 14.5 mm is generated.

In a further embodiment, the method includes the steps of recording images with three different shutter times and joining the recorded images together to yield a high-dynamic range image. In a still further embodiment, the step of determining a plurality of phase information for each sensor field comprises iteratively estimating the image intensity in the Fourier domain.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
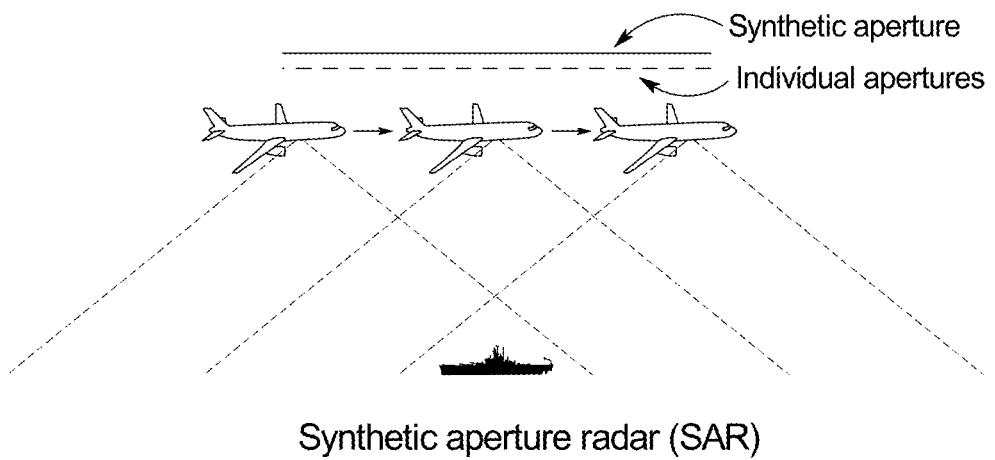
FIG. 1A is a diagram illustrating a prior art mobile radar imaging system utilizing a synthetic aperture radar (SAR).
Figures 1B, 1C:
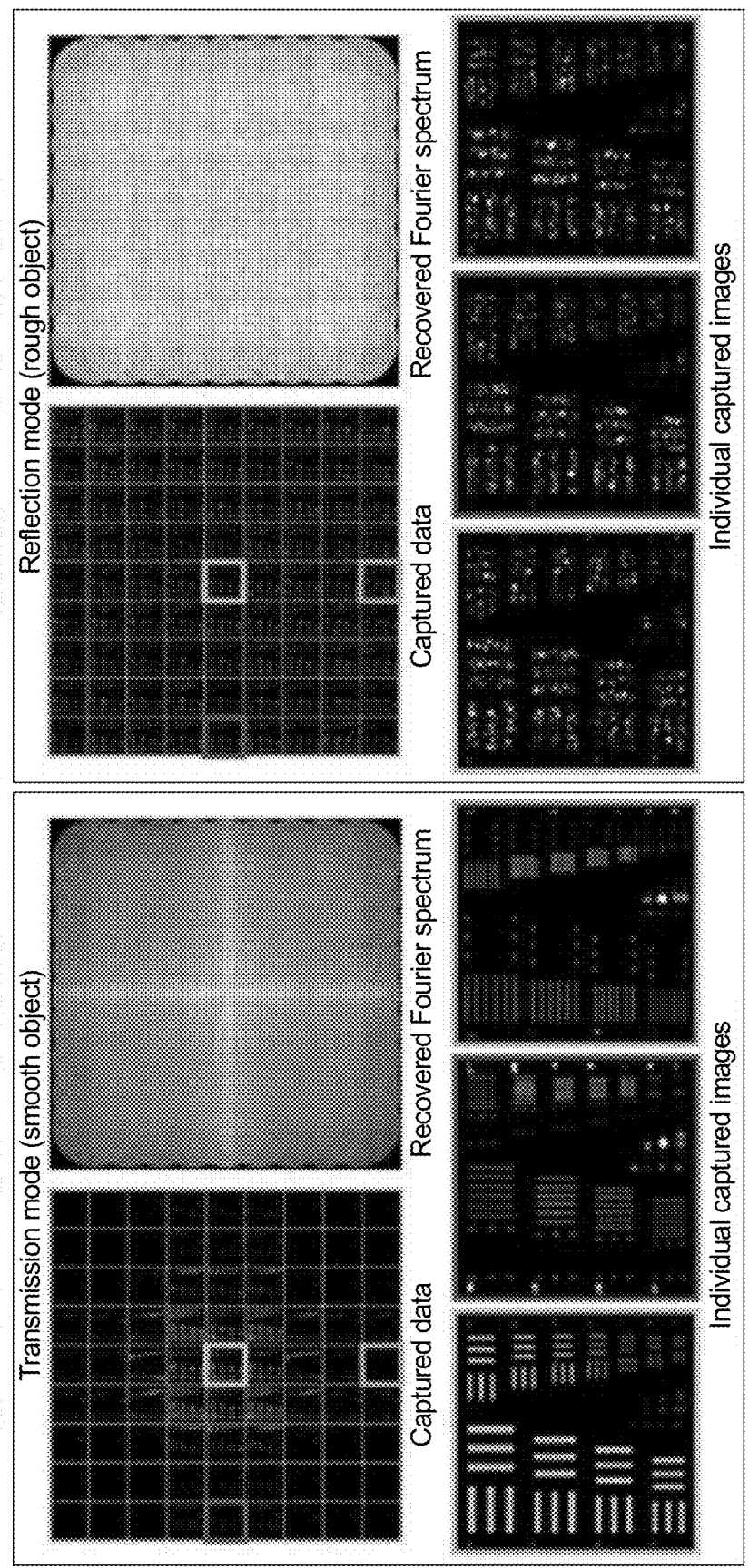
FIGS. 1B and 1C illustrate a simulation of recovering smooth resolution target in a transmissive geometry and a simulation of recovering a rough resolution target in reflective geometry, respectively.
Figure 2A:
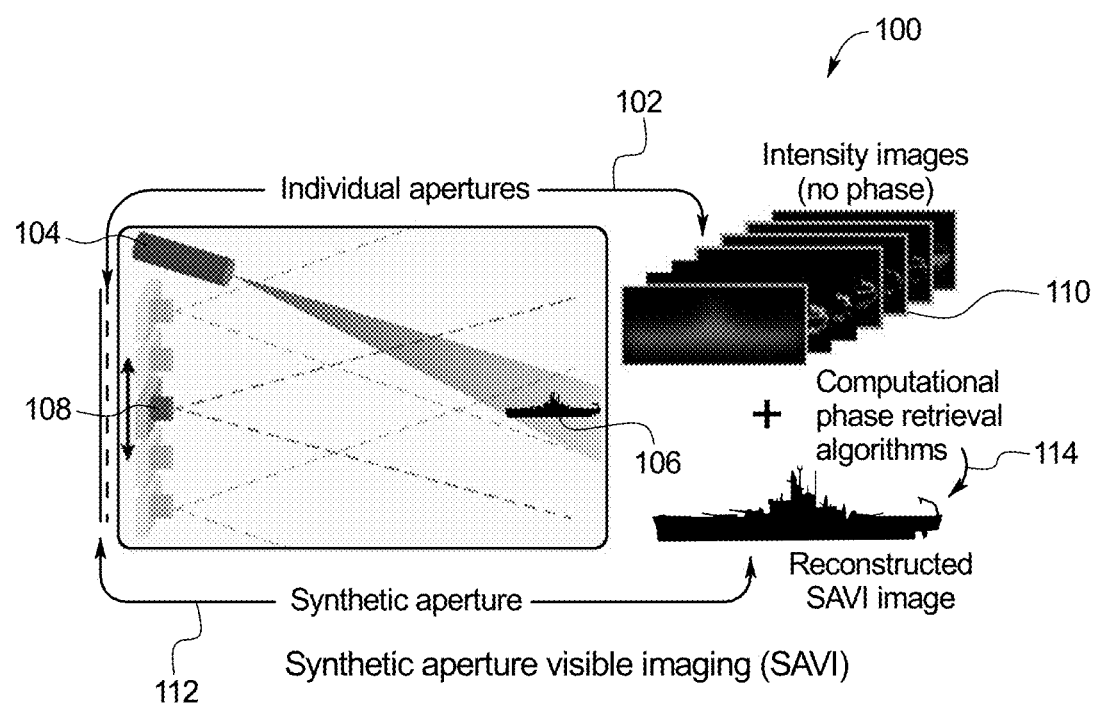
FIGS. 2A and 2B are diagrams illustrating a synthetic aperture visible imaging (SAVI) technique and a SAVI technique utilizing Fourier ptychography.

FIG. 2A is a diagram illustrating a synthetic aperture for visible imaging (SAVI) technique 100. In a first step 102, a coherent source 104, e.g. a laser, illuminates a distant target 106 and the reflected signal is captured by a camera system 108 in intensity images 110. The camera system 108 is translated to capture all of the light that would enter the desired synthetic aperture in a second step 112. Unlike SAR, phase information cannot be recorded for visible light. High-resolution image reconstruction therefore necessitates post-capture computational phase recovery in a third step 114.

Figure 2B:
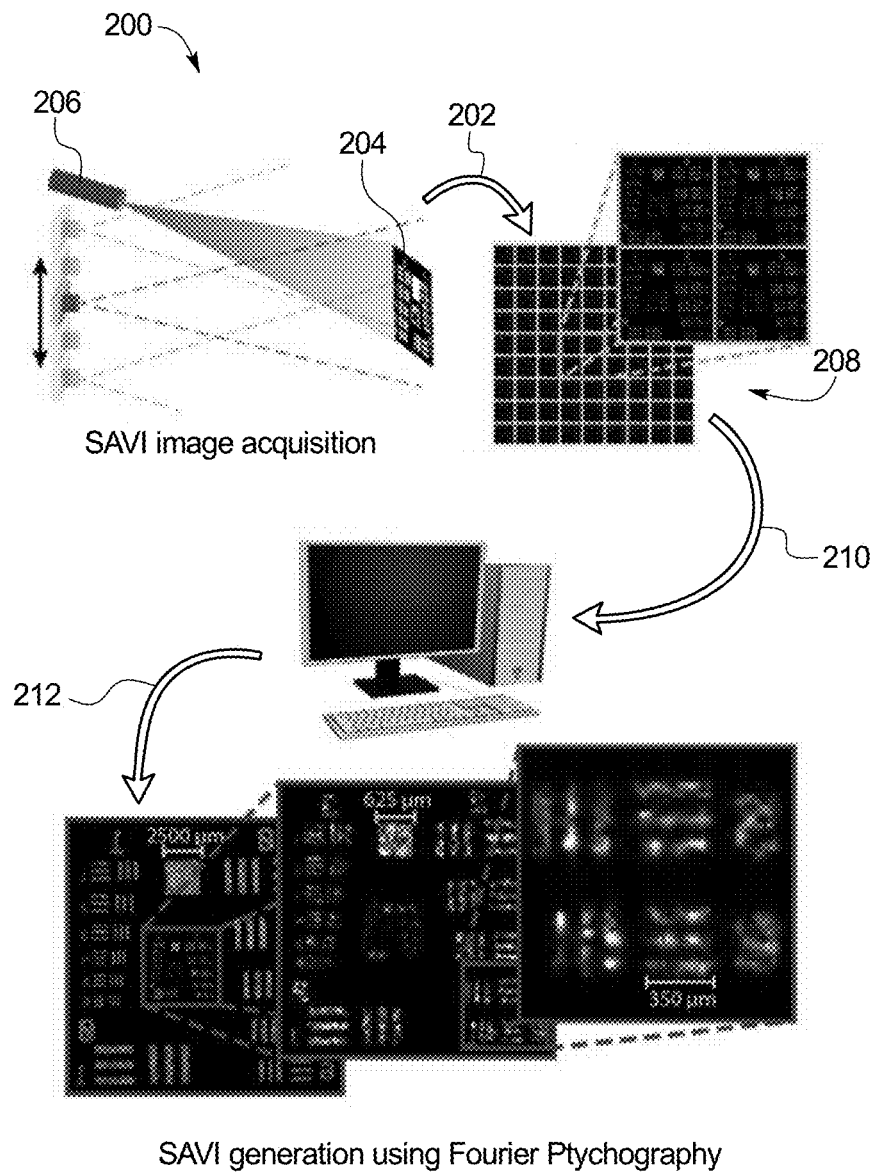

FIG. 2B illustrates a further diagram of SAVI 200 in three steps. In the first step 202, a diffuse object 204 is illuminated with a coherent source 206 and overlapping images 208 are captured. Each image is low-resolution and suffers from speckle. In step 210, missing phase information is recovered computationally, which requires redundancy between captured intensity images. In step 212, a high-resolution image is reconstructed using the recovered phase. Additional examples of captured data and reconstructions are shown in FIGS. 6A-8.

Section I. Materials and Methods: Reconstructing Diffuse Objects

Fourier ptychography relies on the use of monochromatic illumination sources to provide coherent illumination. An overview of the forward model of FP is provided here.

A. Image Formation Model

Figure 5:
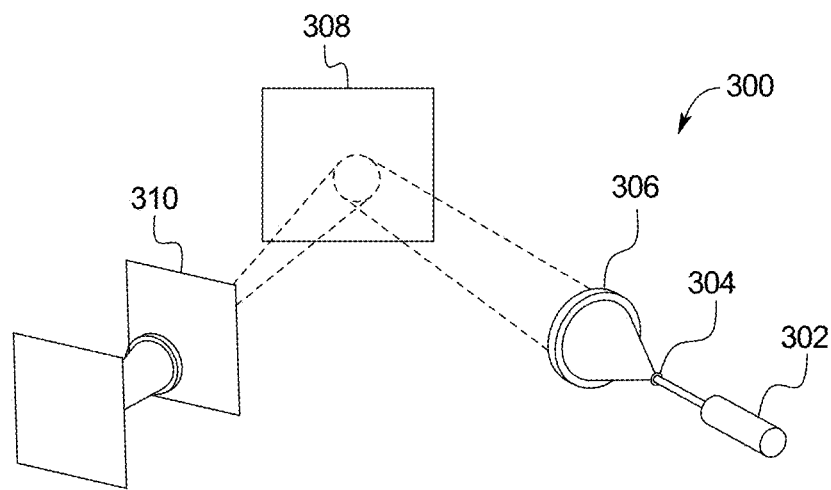
FIG. 5 illustrates a diagram of a system for imaging objects.

In this embodiment, a source illuminates an object which reflects light back toward a camera (see FIG. 5). The source emits a field that is monochromatic with wavelength $\lambda$ and is spatially coherent across the surface of the object of interest. The illumination field interacts with the object and a portion of the field will be reflected back toward the imaging system. The field emanating from the object is a constant 2D complex wave, $\psi(x, y)$.

$\psi(x, y)$ propagates over a sufficiently large distance z toward the imaging system to satisfy the far-field Fraunhofer approximation. The field at the aperture plane of the camera is related to the field at the object through a Fourier transform (37):

$$\Psi(u, v) = \frac{e^{jkz}e^{jk/2z(u^2+v^2)}}{j\lambda z} F_{\frac{1}{\lambda z}}\{\psi(x, y)\}, \quad (1)$$

where $k=2\pi/\lambda$ is the wavenumber and is the two-dimensional Fourier transform scaled by $1/\lambda z$. For simplicity, the multiplicative phase factors and the coordinate scaling have been excluded from the analysis, though these can be accounted for after phase retrieval if desired. To further reduce clutter, spatial coordinates (x, y) will be represented by the vector x and frequency coordinates (u, v) will be represented as u.

The field that intercepts the pupil of the imaging system, $\Psi(u)$, is effectively the Fourier transform of the field at the object plane. Due to the finite diameter of the lens, only a portion of the Fourier transform is imaged onto the camera sensor. Let the transmittance of the pupil, be given by P(u). For an ideal circular lens, P(u) would be defined as:

$$P^m(u) = \begin{cases} 1 & \text{if } \|u\| < \frac{d}{2}, \\ 0 & \text{otherwise} \end{cases} \quad (2)$$

where d is the diameter of the lens.

The camera lens is focused on the image sensor, and therefore also fulfills the Fraunhofer approximation (37), such that the field at the sensor plane (again ignoring phase offsets and scaling) is the Fourier transform of the field immediately after the lens. Since the image sensor only records optical intensity, the final image is given as $$I(x,c) \propto |F\{\Psi(u-c)P(u)\}|^2, \quad (3)$$

where c is the center of the pupil. In Eq. (3), the shift of the camera aperture to capture different regions of the Fourier domain is represented by the equivalent shift of the Fourier pattern relative to the camera. Due to the finite extent of the lens aperture, the recorded image will not contain all of the frequency content of the propagated field $\Psi(u)$. For a lens with diameter d and focal length f, the smallest resolvable feature within one image will be approximately $1.22\lambda f/d$.

B. Recovering High-Resolution Magnitude and Phase

To facilitate the creation of a synthetic aperture, the camera is re-centered in the Fourier plane at N different locations $c_i$, i=1, ..., N. One consequence of sampling in the Fourier domain is that the images must be stitched together in the Fourier domain. From Eq. (3), the image sensor only records the intensity of the complex field and contains no information about the phase. It is therefore necessary to computationally recover the phase of the N intensity measurements. To ensure sufficient information is available for post-capture phase retrieval, care must be taken to provide sufficient overlap between adjacent camera positions. In some embodiments, a minimum of about 65% overlap is typically required in order for phase retrieval to converge to an adequate solution (18, 25, 32).

From Eq. (1), recovering $\Psi(u)$ effectively recovers $\psi(x)$ as the fields are related through a Fourier transform. The present system seeks to solve the following optimization problem:

$$\hat{\Psi}(u), \hat{P}(u) = \min_{\Psi(u), P(u)} \sum_i \||I(x, c_i) - |F\{\Phi(u, c_i)\}|^2\|, \quad (4)$$

where $\Phi(u, c_i)$ is the optical field immediately following the aperture at the ith position, $\Phi(u, c_i) = \Psi(u-c_i)P(u)$.

Defining the data fidelity term of the reconstruction to be the $L_2$ error between measured and estimated intensities in Eq. (4) results in a non-convex optimization problem. Phase retrieval is typically solved using an iterative update scheme similar to those popularized by Gerchberg-Saxton (38) and Fienup (39). In the mth iteration, the estimate of $\Phi(u)$ is propagated to the image plane for each camera position $c_i$, whereupon the measured image intensities are enforced:

$$\Phi^m(u, c_i) = \Psi^m(u - c_i)P(u), \quad (5)$$

$$\phi^m(x, c_i) = F^{-1}\{\Phi^m(u, c_i)\}, \quad (6)$$

$$\phi^{m+1}(x, c_i) = \sqrt{I(x, c_i)} \frac{\phi^m(x, c_i)}{|\phi^m(x, c_i)|}, \quad (7)$$

$$\Phi^{m+1}(u, c_i) = F\{\phi^{m+1}(x, c_i)\}. \quad (8)$$

Differences between successive estimates of the field $\Phi(u, c_i)$ are used to update the estimates of $\Psi(u)$ and P(u) in the Fourier domain. Following the formulation in (25), the estimate of $\Psi(u)$ is given by, $$\Psi^{m+1}(u) = \qquad (9)$$

$$\Psi^m(u) + \frac{|P^m(u+c_i)|}{|P^m(u)|_{max}} \frac{[P^m(u+c_i)]^*}{|P(u+c_i)|^2 + \tau_1} \times [\Phi^{m+1}(u-c_i) - \Phi^m(u-c_i)].$$

The adaptive update step size, $|P^m(u+c_i)|/|P^m(u)|_{max}$, is used in (25) and is based on the work of Rodenburg and Faulkner (40). The contribution of the pupil function is first divided out of the difference and the remainder is used to update the estimate of $\Psi(u)$. A similar update step is used to update the estimate of the pupil function but with the roles of $\Psi(u)$ and $P(u)$ reversed, $$P^{m+1}(u) = \qquad (10)$$

$$P^m(u) + \frac{|\Psi^m(u-c_i)|}{|\Psi^m(u)|_{max}} \frac{[\Psi^m(u-c_i)]^*}{|\Psi^m(u-c_i)|^2 + \tau_2} \times [\Phi^{m+1}(u) - \Phi^m(u)].$$

In the update steps shown in Eq. (9) and Eq. (10), a small value ($\tau_1$ and $\tau_2$ respectively) is added to prevent division by zero. In (18), the updated pupil function was constrained to lie within the support of the initial guess, which corresponds to the numerical aperture of the lens. The support is twice as large as the initial guess to accommodate differences between the experimental setup and the forward model (such as the aperture not being a perfect circle).

Initial estimates of $\Psi(u)$ and $P(u)$ must be provided. The initial estimate of the pupil function is defined to be an ideal circular aperture from Eq. (2) with a diameter determined by the aperture. A common initialization of $\Psi(u)$ for weakly scattering objects is to upsample any of the recorded images (often an image near the DC component) and take its Fourier transform (17, 18, 25). In one embodiment, $\Psi(u)$ is the Fourier transform of the average of all N captured intensity images. Averaging independent measurements of the field suppresses speckle in the initial estimate (1, 3).

C. Optically Rough Objects

Typical applications of FP in microscopy have dealt with objects that have gradual changes in refractive index, which leads to transfer functions with relatively smooth phase components. However, the surfaces of most real-world objects are "optically rough" and exhibit random phase.

When coherent light reflects off of an object, each point along the surface acts as a secondary source of spherical illumination. The constituent components of the reflected optical field will be comprised of a summation of each of the secondary sources. If the variation in path length exceeds the wavelength of the incident light, λ—550 nm, the secondary sources will be out of phase with one another. Summation of the dephased point sources leads to destructive interference which manifests as speckle (41, 42).

Suppose that the variation of surface height is at least equal to A and is uniformly distributed. For any point in the optical field, the probability of measuring an intensity I (squared amplitude) follows a negative exponential distribution (43):

$$p(I) = \frac{1}{\mu} e^{-\frac{1}{\mu}} \text{ for } I \geq 0, \qquad (11)$$

where μ is the mean intensity. It should be noted that Eq. (11) holds for fully-developed speckle whereby polarized light maintains its polarization state after reflection. Most real-world objects exhibit subsurface scattering that destroys the polarization state of the incident light. In such a case the intensity distribution is given as (44):

$$p(I) = 4\frac{1}{\mu^2} e^{-2\frac{1}{\mu}} \text{ for } I \geq 0. \qquad (12)$$

For the purposes of this paper it is sufficient to say that speckle intensity follows a negative exponential distribution.

In an imaging geometry, the apparent speckle size is compounded by diffraction blur induced by the aperture of the lens. As such, the speckle size at the sensor plane is approximately twice that of the smallest resolvable image features (2.44λf/d) (43). Fourier ptychography is used to reduce diffraction blur by synthetically increasing the aperture diameter. In the presence of speckle, FP also reduces speckle size.

The formation of speckle is compatible with the analysis of the formation model given here and used in other previous work, and in fact is a natural consequence of the object having a randomly distributed phase. Previous FP implementations have generally avoided dealing with speckle by either imaging thin biological samples which naturally have smooth phase, by using partially coherent light (45), or by a combination of the two. The present application provides a macroscopic FP imaging system that recovers optically rough objects.

D. Suppressing Speckle

Fourier Ptychography reduces speckle size by reducing diffraction blur, however the variation in the remaining speckle is still large. The recovery algorithm described in Section II-B below leads to the suppression of speckle during reconstruction in the estimate of $\Psi(u)$. Section II-B discusses the comparison of the recovery algorithm of the method of the present application with an alternate speckle suppression technique of averaging independent measurements (1, 3).

From Eq. (11) and Eq. (12), speckle intensity follows a negative exponential distribution, which is consistent with a multiplicative noise model. It is important to note that speckle is not noise in the conventional sense. The underlying random phase of the object distorts the intensity field recorded by the sensor. It is desirable to mitigate any distortion that manifests as speckle in order to recover a high-resolution intensity image.[1] In this sense, speckle is referred to as "noise."

[1] Recovering a high-resolution estimate of the magnitude and phase may be useful for determining material properties and may be accomplished by running a second reconstruction that omits the speckle suppression step.

Much of the research related to image denoising techniques, including the state-of-the-art BM3D algorithm (46), assumes an additive noise model. The intensity of $\Psi(x)$ is denoised during image recovery in order to recover a high quality intensity image. To overcome the multiplicative distortions caused by speckle, the noise is converted by taking the natural logarithm of the intensity at iteration m into a more convenient additive model:

$$\xi^m(x) = \ln(|\psi^m(x)|^2), \qquad (13)$$

where the new variable $\xi^m(x)$ is modeled as the true (noise free) signal $\xi'(x)$ corrupted by additive noise $\eta(x)$, $$\xi^m(x) = \xi'(x) + \eta(x). \qquad (14)$$

Extracting an updated estimate, $\xi^{m+1}(x)$, that better approximates $\xi'(x)$ can be achieved using any of the standard image denoising techniques. The following straightforward image noise suppression method may be used in the present application: wavelet decomposition followed by soft-thresholding wavelet components whose magnitudes exceed ρ (47). Denoising is accomplished by decomposing using an orthogonal wavelet basis W and denoising operator $D(\alpha,\rho)$:

$$\xi^{m+1}(r) = W[D(W^T \xi^m(x), \rho)], \quad (15)$$

$$D(\alpha, \rho) = \text{sgn}(\alpha)\max(0, |\alpha| - \rho). \quad (16)$$

Symlet wavelets of order eight are used as the basis for wavelet decomposition and decompose to the second level. The value of ρ may be set a priori or may be updated automatically, e.g. using Stein's unbiased risk estimator (SURE) (48). In the embodiment described below, the latter method is adopted. Finally, the amplitude of $\psi^{m+1}(x)$ is updated in a manner similar to Eq. (8), $$\psi^{m+1}(x) = \sqrt{e^{\xi^{m+1}(x)}} \frac{\psi^m(x)}{|\psi^m(x)|}, \quad (17)$$

which is then transformed back into the Fourier domain as $\Psi^{m+1}(u)$ and the recovery algorithm proceeds as previously described. In one embodiment of the speckle suppression, large coefficients in the wavelet domain are removed, which is similar to imposing a histogram constraint commonly used in phase retrieval (49) in the wavelet domain.

Denoising is applied every s iterations of the recovery algorithm. Spacing out denoising allows adequate time for information transfer and reinforcement between the spatial and Fourier domains during phase retrieval. The recovery algorithm effectively has an outer loop to perform the denoising, and an inner loop for phase retrieval.

Figure 3:
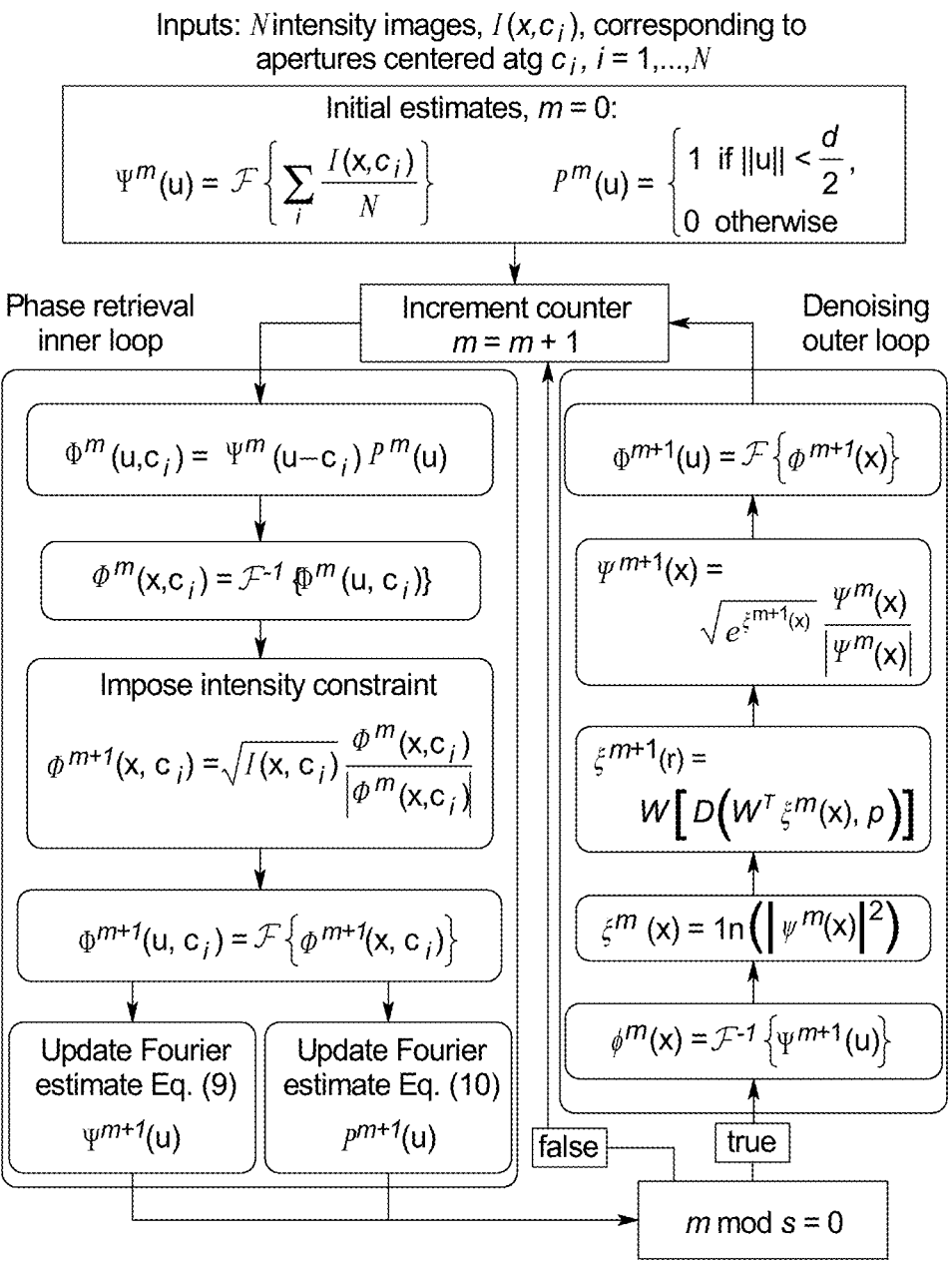
FIG. 3 is a flow chart of a recovery algorithm to suppress speckle during the reconstruction step of the SAVI technique shown in FIG. 2B.

A visual representation of the complete recovery algorithm is shown in FIG. 3. A high resolution estimate of $\Psi(u)$ is recovered by iteratively enforcing intensity measurement constraints in the spatial domain and updating estimates of the spectrum in the Fourier domain. Image denoising is applied every s iterations to suppress the influence of speckle noise in the final reconstruction. The branch on the left side of FIG. 3 is a traditional FP recovery algorithm used in (18, 25). The brand on the right side of FIG. 3 is image denoising to reduce speckle noise in the estimate of $\Psi(u)$.

Figure 4:
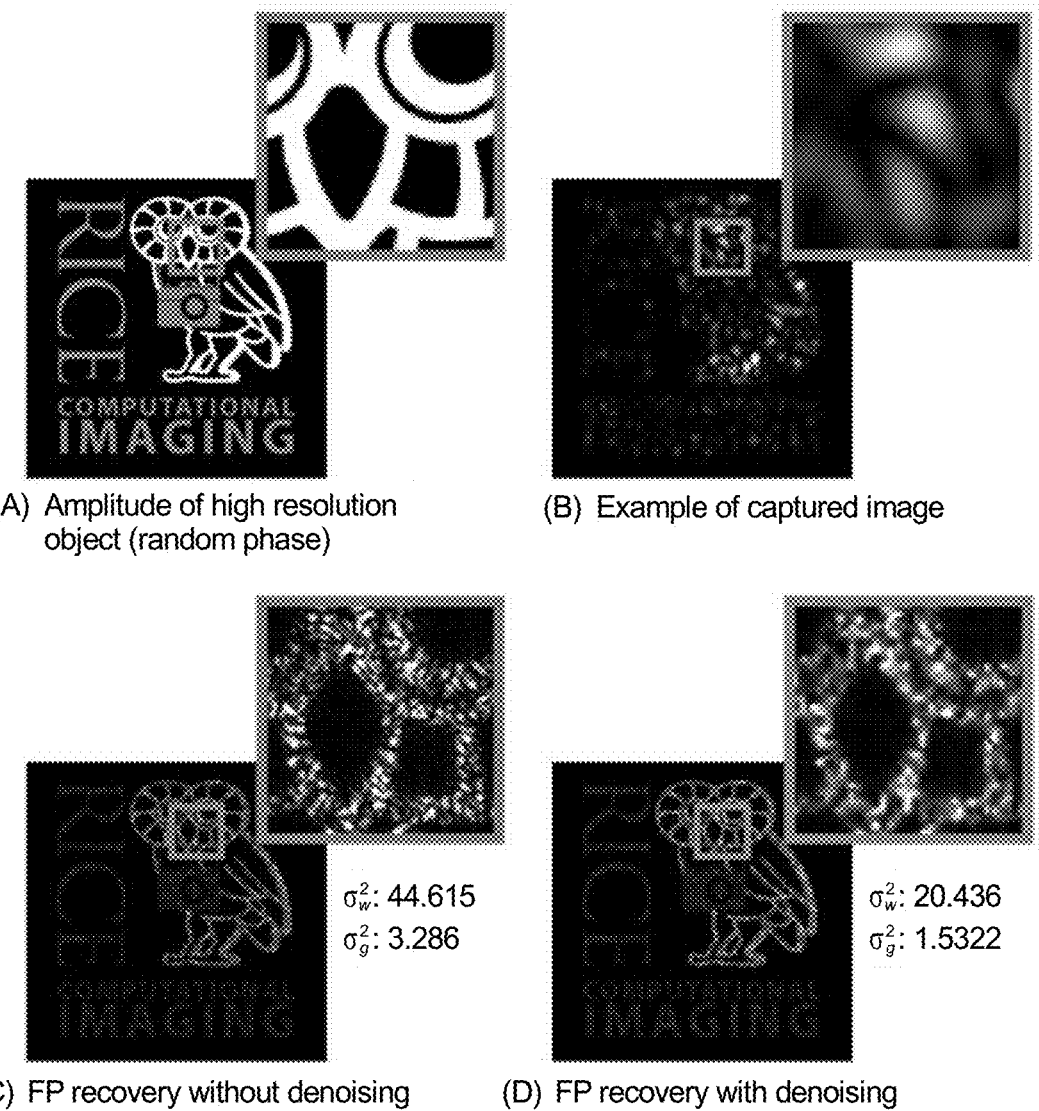
FIG. 4 is images illustrating the application of the recovery algorithm of FIG. 3.

FIG. 4 demonstrates the benefit of incorporating the denoising step of FIG. 3 into the recovery algorithm in the presence of subjective speckle. A simulated high resolution complex object is imaged by a diffraction limited system. The amplitude is a resolution chart shown in (A), and the phase is randomly distributed in the range $[-\pi, \pi]$. Direct observation of the object results in an image degraded by diffraction blur and speckle, one such example is shown in (B). Using FP without the denoising regularization results in artifacts in the reconstruction as shown in (C). Incorporating the denoising step during reconstruction, as in (D), reduces some of the artifacts present in (C) and improves overall contrast by reducing the intensity variation in the speckle regions. The brightness of the outsets in (B)-(D) has been increased to highlight the presence of reconstruction artifacts.

To compare the performance between (C) and (D), the variance of the white owl, $\sigma_w^2$, and the grey text and camera, $\sigma_g^2$, are computed. Without denoising, the variance of the white and grey regions is 44.6 and 3.2 pixels respectively (with a maximum intensity of 255). Using the proposed denoising method reduces the variance by 55% to 20.4 and 1.5 pixels respectively in the white and grey regions.

Section II
Results: Fourier Ptychography in Reflection Geometry

To validate the proposed method of creating synthetic apertures for visible imaging, a table top device is constructed to capture images of objects under coherent illumination. Image recovery is performed in MATLAB.

A. Experimental Setup

A simplified rendering of the experimental setup for reflection geometry Fourier ptychography is shown in FIG. 5. The system 300 includes a laser diode 302 (Edmund Optics #64-825) operating at 532 nm is passed through a spatial filter 304 and a 2-inch diameter focusing lens 306 to illuminate an object 308 positioned about 1 meter away. For clarity, the spatial filter 304 has been represented as a pinhole and the camera body has been removed in FIG. 5. Additional optical elements such as ND filters and polarizers have also been omitted from the diagram.

Light scattered off of the object 308 is collected by a camera 310 positioned near the focusing lens 306. In order to satisfy the Fraunhofer diffraction approximation for a short optical path, a lens 306 is used to focus the coherent illumination at the aperture plane of the camera lens. Multiple images are acquired to create a large synthetic aperture by translating the camera and lens using a translation stage. While the model in Section II assumes free space propagation, the analysis holds for converging spherical waves. Imaging over larger distances would not require a lens to satisfy the far-field conditions, and the focusing lens would be repurposed as a collimating lens instead. Low-resolution images are captured by moving the camera (both the lens and sensor) on a XY translation stage to sample a larger region of Fourier space.

In the experiments described herein, the following parameters and components are used. The camera used is a Point Grey machine vision camera (BFLY-PGE-50A2M-CS) equipped with an Aptina MT9P031 CMOS image sensor with a pixel pitch of 2.2 μm. In front of the sensor is a 75 mm focal length lens and an aperture diameter of 2.5 mm (f/30), which produces a diffraction spot size of ~39 μm on the sensor. For the USAF target and fingerprint datasets, adjacent positions of the camera are 0.7 mm apart to ensure sufficient overlap between samples in the Fourier domain. A grid of 19×19 images is captured to produce a synthetic aperture of 15.1 mm, six times larger than the lens' aperture. The parameters used to capture the reverse side of a US $2 bill in FIG. 6B are slightly modified. A 21×21 grid of images is collected with adjacent positions separated by 0.6 mm, yielding a synthetic aperture of 14.5 mm.

Exposure bracketing and image averaging are employed to increase the dynamic range and reduce read noise respectively. At each position, the camera records images with 3 different shutter times (doubling the exposure between each). For each exposure time, between 5-10 images are averaged to reduce read noise. The exposures are then joined together to yield a high-dynamic range image. An image sensor with a larger ADC and larger pixels could be substituted to decrease acquisition time instead of employing averaging and exposure bracketing.

Accurate alignment of the low-resolution images is crucial to accurately reconstruct a high-resolution image. Checkerboard fiducial markers are placed at the periphery of the object, outside of the region illuminated by coherent light, to allow for the ease of alignment post-capture using standard tools (50). If fiducial markers are not present, diffuse images can be aligned by correlating speckle patterns in adjacent images (11). In long distance imaging, it is likely that only a portion of the scene will be illuminated and key features in the rest of the scene may be used for image alignment, which matches the operating parameters of our experimental setup.

B. SAVI for Diffuse Objects

Figure 6A:
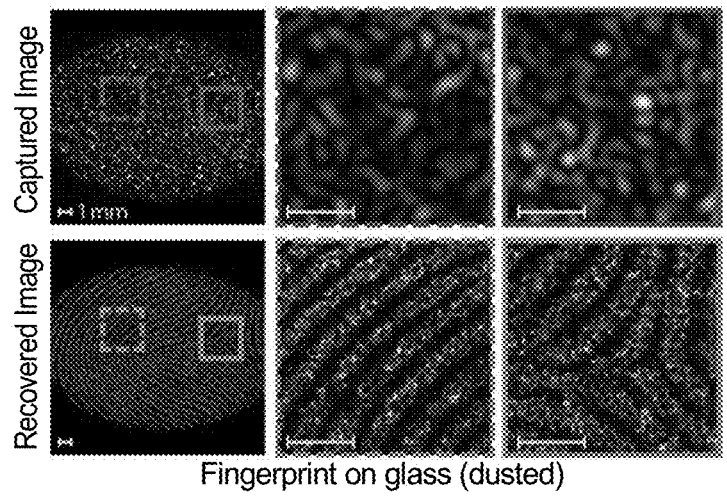
FIGS. 6A and 6B illustrate results of utilizing the system of FIG. 5.
Figure 6B:
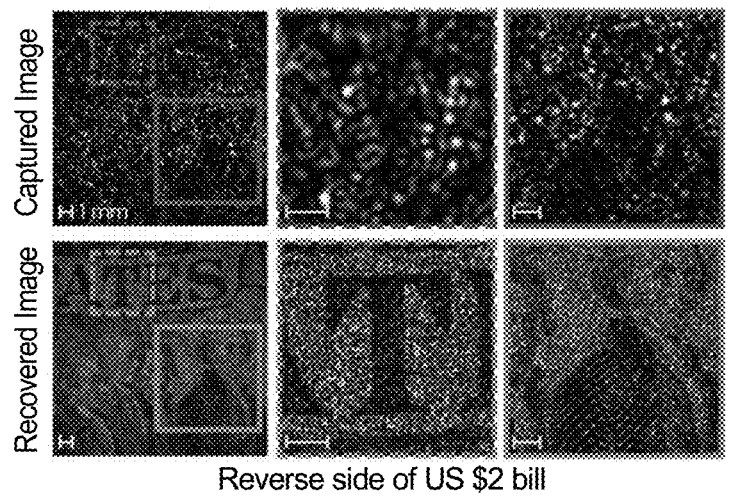

FIGS. 6A and 6B provide examples of results using SAVI to improve spatial resolution in long-range imaging for everyday diffuse objects. Images captured with a small aperture are unrecognizable due to diffraction blur and speckle. Following reconstruction, fine details are visible. In FIGS. 6A and 6B, two common objects are illuminated with coherent light: in FIG. 6A a fingerprint deposited on glass is presented and FIG. 6B shows the reverse side of a US $2 bill. The bar represents 1 mm in FIG. 6A and 2 mm in FIG. 6B. A single captured image for either object is unrecognizable due to the extreme degradation from speckle and diffraction blur. After reconstruction using Fourier ptychography, which amounts to a six-fold improvement in resolution, both images are recognizable and fine details can be clearly observed.

The ability to resolve biometric markers from large stand-off distances has many applications in surveillance and authentication. Current methods of data collection are often intrusive, e.g. using a fingerprint scanner. FIG. 6A illustrates how a fingerprint can be recovered from a piece of glass by means of SAVI. The fingerprint is coated with powder to provide relief against the transparent glass. Fine features necessary to identify the print are recovered as illustrated in the zoomed-in detail regions. Due to the limitations in the current prototype, only stationary objects can be recovered; however, a real-time acquisition system would enable contactless on-the-fly authentication of users simply holding a finger aloft.

Capturing legible text and images is also of interest in surveillance scenarios, such as verifying payment amounts at retail outlets. However, recovering the high-resolution image for the $2 bill (FIG. 6B) introduced an unanticipated problem during reconstruction. Unlike the fingerprint, the intensities on the cloth are not binary which results in reduced contrast between the foreground and background. To combat the added difficulty of recovering such a varied object, the overlap between adjacent measurements was increased to 76% and a 21×21 grid was sampled. An analysis of recovering scenes with low contrast is discussed in Section IV below.

During phase retrieval, a high-resolution estimate of the phase emanating from the scene is recovered. As expected for a diffusely scattering object, the phase exhibits a random profile in the range $[-\pi, \pi]$.

USAF resolution target: In order to quantitatively investigate the performance of SAVI, a negative USAF chrome-on-glass target with flat white paint applied to the chrome surface of the target is imaged. The target is imaged through the back of the glass plate to retain the high-resolution features characteristic of the resolution chart. An example of a captured image is shown in the first row of FIG. 7.

The specular reflections off of the glass and chrome surfaces of the target are orders of magnitude stronger than the diffuse light scattered by the painted surface. To mitigate the effects of specular reflection, the angle between the illumination, object, and camera was adjusted so that the direct reflection does not enter the synthetic aperture of the camera system. Additionally, crossed polarizers are used to attenuate the contributions of diffracted direct illumination (at the boundaries of the bars).

Figure 7:
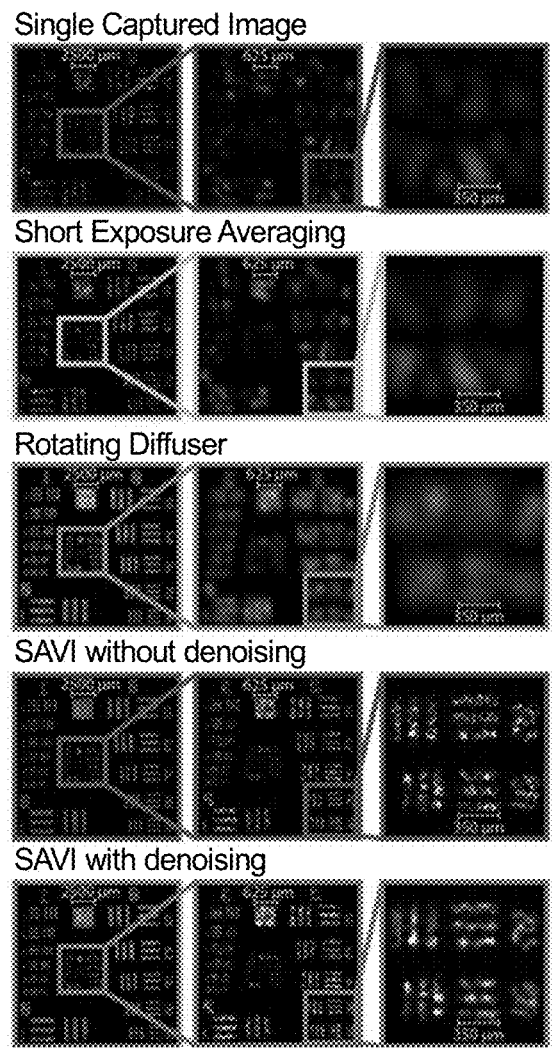
FIG. 7 illustrates examples of a captured image at each stage of the system of FIG. 5.

Directly imaging the target results in a characteristic speckle pattern as shown in the first row of FIG. 7. For the given imaging geometry, resolution is limited to 1.26 line pairs per millimeter or a bar width of 397 µm. A common method to reduce speckle noise, and increase resolution, is to average multiple short exposure images of a varying speckle field to extract spatial frequencies beyond the capability of any single measurement (1, 3). To induce a change in speckle pattern the target is vibrated and a sequence of 361 short-exposure images are acquired, equal to the number of images used to create the synthetic aperture. The exposure duration is set to be ⅕ of the middle exposure time used during FP data collection. The average of the short-exposure images is shown in the second row of FIG. 7. As expected, the resolution of the averaged image surpasses that of the captured image and 280 µm features are now resolvable.

Speckle can also be suppressed by inserting a rotating diffuser in the optical path before the object (51) to destroy the temporal coherence of the illumination source. As shown in the third row of FIG. 7, imaging with a rotating diffuser improves resolution so that features as small as 157 µm are resolvable. A consequence of using a rotating diffuser, light intensity falls off as $1/d^2$ which greatly impacts the intensity measured by the camera and limits the effective working distance of the system.

While individual images exhibit significant blur and diffraction, which can be partially mitigated by averaging, the resulting image from FP has a 6× improvement in resolution with resolvable features as small as 70 µm (fourth row of FIG. 7). The increased resolution is also accompanied by a corresponding 6× decrease in speckle size, however the speckle is still present in the final reconstruction. By introducing the denoising prior from Eq. (17) into the reconstruction algorithm, the effect of the speckle can be further mitigated to improve contrast while retaining the same resolution improvements as traditional FP algorithms. The full reconstruction with regularization is shown in the fifth row of FIG. 7.

Figure 8:
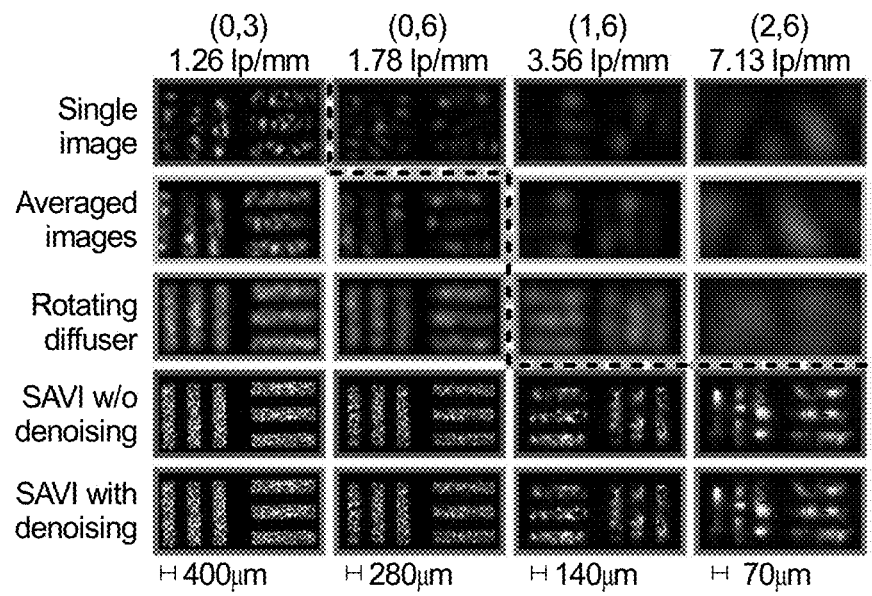
FIG. 8 illustrates detailed regions at each stage illustrated in FIG. 7.

Zoomed in details of the five imaging scenarios of FIG. 7 are shown in FIG. 8. Images above dashed line are not resolvable. Notice that the resolution and contrast quickly deteriorates for individual captured images and the averaged image while using the rotating diffuser increases resolution marginally better. The images obtained using FP exhibit higher resolution than directly measuring the scene; furthermore, the addition of the denoiser reduces variation within the speckle regions to improve contrast.

The USAF resolution chart can be used to quantify the resolving power of an optical system. Many metrics to compute contrast rely on the ratio of the maximum value to the minimum value along a cross section perpendicular to the bar orientation. This is a serviceable definition in most cases; however, when speckle is present the random distribution of intensities can skew contrast measurements. To account for the variable intensity due to speckle, bar positions known a priori and the average intensities of the white ($\bar{w}$) and black bars ($\bar{b}$) are used to compute contrast. The contrast C is further scaled by the average intensity in the bright and dark regions to account for speckle migration during reconstruction, $$C = \frac{\bar{w} - \bar{b}}{\bar{w} + \bar{b}} * \bar{w} * (1 - \bar{b}). \tag{18}$$

Bar locations are manually located using a high-resolution image of the USAF target and are scaled to the correct size for each test image. The threshold for resolvability must be adjusted to compensate to the additional scaling in Eq. (18). In some embodiments, a contrast value of 0.05 is the resolution limit.

Figure 9A:
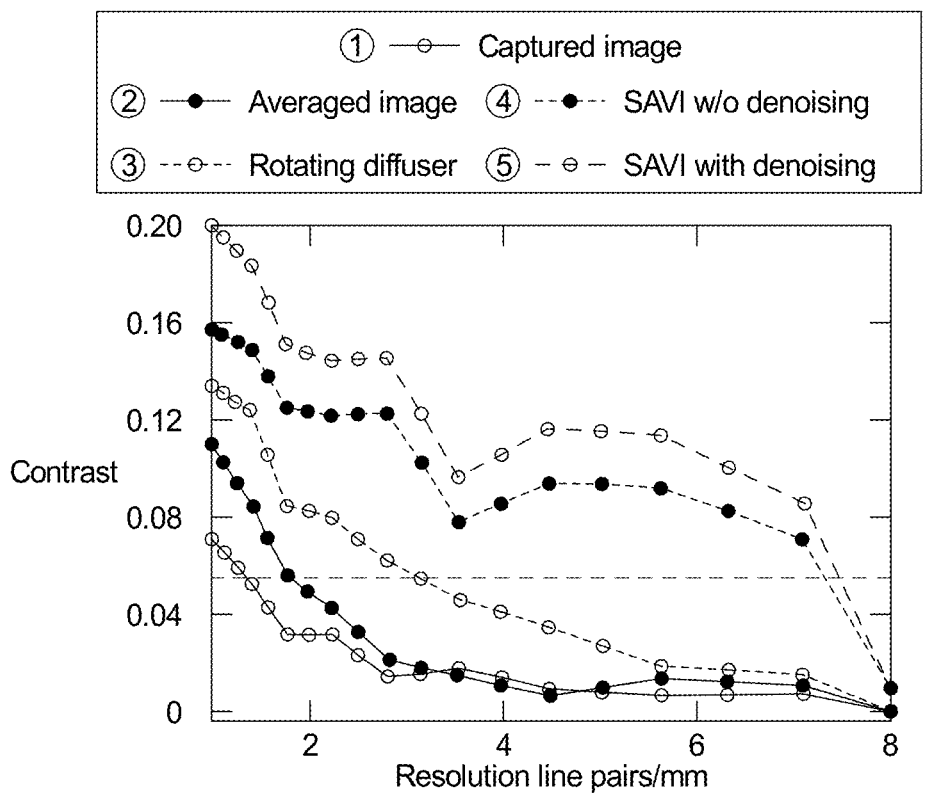
FIGS. 9A and 9B are graphs illustrating contrast as a function of feature size and speckle size relative to aperture diameter, respectively, of the images of FIGS. 7 and 8.

Contrast plots for the USAF target are presented in FIG. 9A. Contrast for the observation image and the averaged short exposure image rapidly deteriorate in agreement with observations made in FIGS. 7 and 8. Reconstruction of the synthetic aperture image using the full complement of measurements significantly improves resolution. Including the image space denoising during reconstruction increases the contrast in the bars which aids in discrimination of fine spatial features. Resolution in the captured image (1) deteriorates rapidly. Mimicking an incoherent source via averaging (2) or rotating diffuser (3) increases spatial resolution. SAVI without (4) and with (5) a regularizer drastically increases resolution. Use of the regularizer improves image contrast.

Figure 9B:
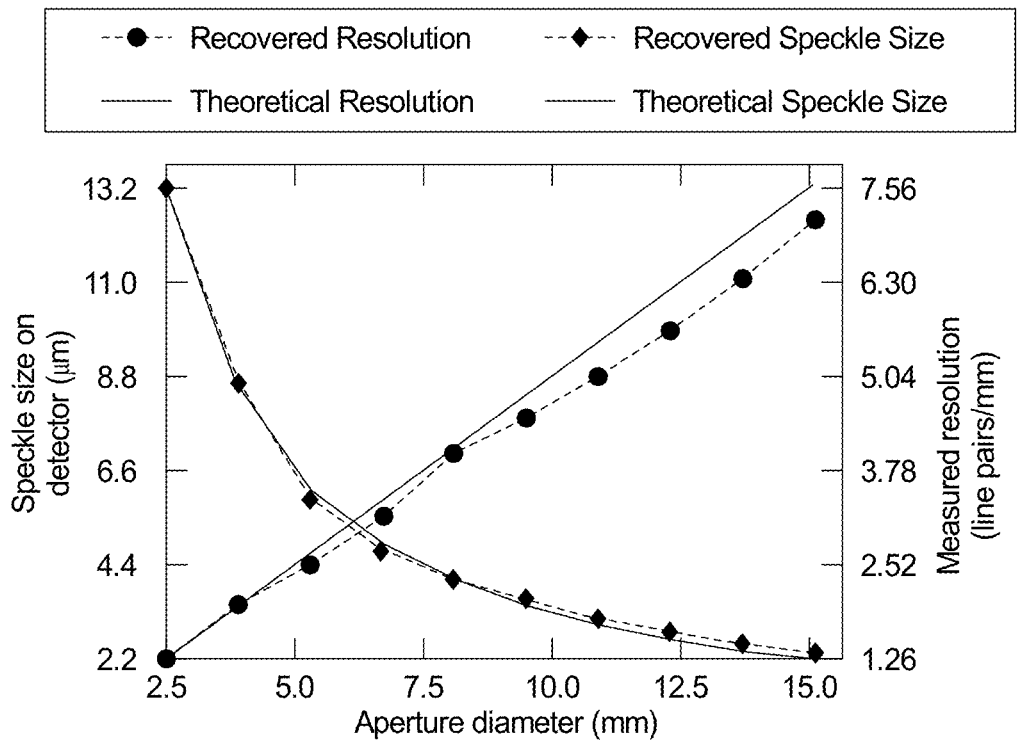

Resolution Gains and Speckle Reduction:

As the goal of the proposed method is to emulate a larger synthetic aperture, and diffraction blur and speckle size are inversely proportional to the size of the imaging aperture, the improvement in resolution should increase linearly with the increase in aperture diameter. To illustrate this effect, the USAF target was reconstructed with varying synthetic aperture sizes by only using subsets of the full 19×19 dataset. In this manner, the size of the synthetic aperture was increased from 2.5 mm to 15.1 mm in steps of 0.70 mm. FIG. 9B shows that the resolution improves and speckle size decreases according to theory. Specifically, speckle size and resolution loss are inversely proportional to the size of the imaging aperture. Recovery was performed without the use of the denoising regularizer so that an accurate measurement of the speckle size was obtained. Speckle size is measured as the full width half maximum of autocorrelation function of the intensity pattern (43). A region of the registration square at the top of the target (the square between group 1, element 1 and group 0, element 2) is chosen to measure the speckle size and the reported value is the average of both the vertical and horizontal profiles. It should also be noted that the discrete nature of the USAF target causes the measured resolution to deviate from the predicted values. The measured speckle size decreases according to theoretical predictions, and demonstrates a 6× improvement in spatial resolution. In FIG. 9B, the measured and predicted values are shown in dashed and solid lines, respectively. Speckles size computed without use of the denoising regularizer. The slight deviation of measured improvement is a consequence of discretization of the resolution chart.

Section III

Discussion: Considerations for Real-World Implementations

Figure 10:
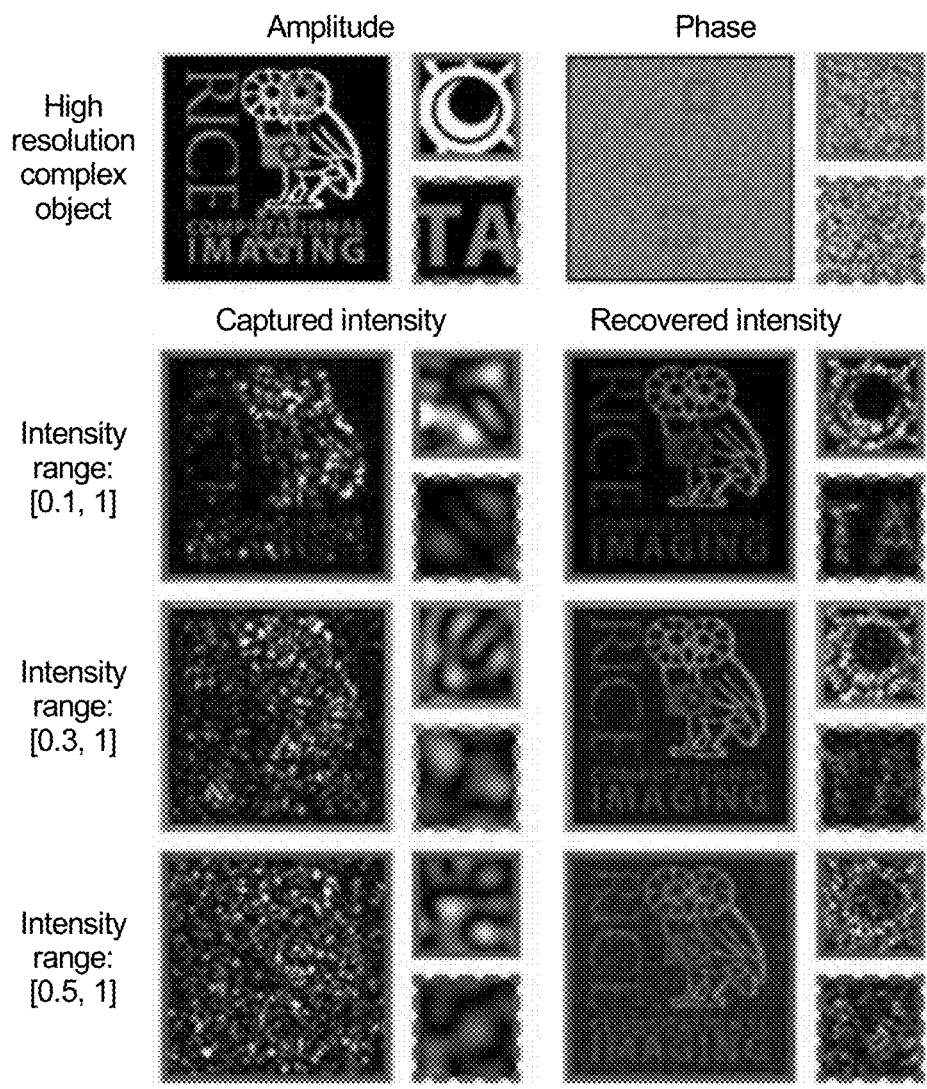
FIG. 10 illustrates simulated reconstructions for varying background/foreground contrast ratios.

One important area of further study is modeling and accounting for objects with low contrast. FIG. 10 illustrates the simulation of super-resolving a complex object whose amplitude has varying brightness ratios. The owl is the brightest element (amplitude of 1), the background is the darkest element, and brightness of the text and camera is the average of the owl and background. The minimum amplitude is varied from 0.1 to 0.5 and a simulated FP data capture is generated matching the experimental parameters used for the USAF and fingerprint datasets (focal length=75 mm, aperture diameter=2.5 mm, overlap=72%, synthetic aperture size=15.1 mm).

Objects with strong contrast between the foreground and background amplitude values have a higher fidelity reconstruction than objects where the background and foreground amplitudes are similar. FIG. 10 provides the high-resolution complex object used for testing in the top row. The bottom three rows represent reconstructions where the amplitude in the high resolution object is varied to different intensity ranges. As the contrast decreases in the amplitude of the high-resolution object as shown in the left column of FIG. 10, a larger area of the captured images exhibits speckle. The reconstruction quality decreases as the contrast increases as shown in the right column of FIG. 10. Speckle appears in the background and fine features that can be seen with a relatively high contrast (first row) are no longer resolvable (third row).

When the amplitude of the background is non-zero, speckles will form. Removing the speckle from the background will require stronger regularization than the method presented in this paper, and is a promising avenue of research. Alternative strategies, such as destroying temporal coherence to reduce speckle contrast have been employed in FP microscopy (35), and may be of some benefit in near- to mid-range macroscopic imaging.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

References and Notes

1. D. L. Fried, Optical resolution through a randomly inhomogeneous medium for very long and very short exposures. *JOSA.* 56, 1372–1379 (1966).

2. D. Korff, Analysis of a method for obtaining near-diffraction-limited information in the presence of atmospheric turbulence. *JOSA.* 63, 971–980 (1973).

3. M. G. Miller, A. M. Schneiderman, P. F. Kellen, Comparison of methods for processing short-exposure data from large telescopes. *Astrophys. J.* 186, L91--L93 (1973).

4. K. T. Knox, B. J. Thompson, Recovery of images from atmospherically degraded short-exposure photographs. *Astrophys. J.* 193, L45--L48 (1974).

5. J. W. Hardy, Active optics: a new technology for the control of light. *Proc. IEEE.* 66, 651–697 (1978).

6. J. Y. Wang, J. K. Markey, Modal compensation of atmospheric turbulence phase distortion. *JOSA.* 68, 78–87 (1978).

7. T. R. Hillman, T. Gutzler, S. A. Alexandrov, D. D. Sampson, High-resolution, Wide-field Object Reconstruction With Synthetic Aperture Fourier Holographic Optical Microscopy. *Opt. Express.* 17, 7873–7892 (2009).

8. L. Mart'\inez-León, B. Javidi, Synthetic Aperture Single-Exposure On-Axis Digital Holography. *Opt. Express.* 16, 161–169 (2008).

9. J. H. Massig, Digital Off-Axis Holography With a Synthetic Aperture. *Opt. Lett.* 27, 2179–2181 (2002).

10. V. Mico, Z. Zalevsky, P. García-Martínez, J. García, Synthetic aperture superresolution with multiple off-axis holograms. *J. Opt. Soc. Am. A. Opt. Image Sci. Vis.* 23, 3162–3170 (2006).

11. A. E. Tippie, A. Kumar, J. R. Fienup, High-resolution synthetic-aperture digital holography with digital phase and pupil correction. *Opt. Express.* 19, 12027–12038 (2011).

12. S. Baker, T. Kanade, Limits on Super-resolution and How to Break Them. *Pattern Anal. Mach. Intell. IEEE Trans.* 24, 1167–1183 (2002).

13. Z. Lin, H.-Y. Shum, Fundamental Limits of Reconstruction-based Superresolution Algorithms Under Local Translation. *Pattern Anal. Mach. Intell. IEEE Trans.* 26, 83–97 (2004).

14. P. Milanfar, Ed., *Super-Resolution Imaging* (CRC Press, 2010).

15. W. T. Freeman, T. R. Jones, E. C. Pasztor, Example-based Super-resolution. *Comput. Graph. Appl. IEEE.* 22, 56–65 (2002).

16. D. Glasner, S. Bagon, M. Irani, in *Computer Vision, 2009 IEEE 12th International Conference on* (2009), pp. 349–356.

17. G. Zheng, R. Horstmeyer, C. Yang, Wide-field, High-resolution Fourier Ptychographic Microscopy. *Nat. Photonics.* 7, 739–745 (2013).

18. X. Ou, G. Zheng, C. Yang, Embedded Pupil Function Recovery for Fourier Ptychographic Microscopy. *Opt. Express.* 22, 4960–4972 (2014).

19. R. Horstmeyer, X. Ou, J. Chung, G. Zheng, C. Yang, Overlapped Fourier Coding for Optical Aberration Removal. *Opt. Express.* 22, 24062–24080 (2014).

20. S. Dong *et al.*, Aperture-Scanning Fourier Ptychography for 3D Refocusing and Super-resolution Macroscopic Imaging. *Opt. Express.* 22, 13586–13599 (2014).

21. P. Li, D. J. Batey, T. B. Edo, J. M. Rodenburg, Separation of Three-Dimensional Scattering Effects in Tilt-Series Fourier Ptychography. *Ultramicroscopy.* 158, 1–7

22. L. Tian, L. Waller, 3D Intensity and Phase Imaging From Light Field Measurements in an LED Array Microscope. *Optica.* 2, 104–111 (2015).

23. R. Horstmeyer, J. Chung, X. Ou, G. Zheng, C. Yang, Diffraction tomography with Fourier ptychography. *Optica.* 3, 827–835 (2016).

24. S. Dong, R. Shiradkar, P. Nanda, G. Zheng, Spectral Multiplexing and Coherent-State Decomposition in Fourier Ptychographic Imaging. *Biomed. Opt. Express.* 5, 1757 (2014).

25. L. Tian, X. Li, K. Ramchandran, L. Waller, Multiplexed Coded Illumination for Fourier Ptychography with an LED Array Microscope. *Biomed. Opt. Express.* 5, 2376–2389 (2014).

26. S. Dong, Z. Bian, R. Shiradkar, G. Zheng, Sparsely sampled Fourier ptychography. *Opt. Express.* 22, 5455–5464 (2014).

27. K. Guo, S. Dong, P. Nanda, G. Zheng, Optimization of Sampling Pattern and the Design of Fourier Ptychographic Illuminator. *Opt. Express.* 23, 6171–6180 (2015).

28. R. W. Gerchberg, A Practical Algorithm for the Determination of Phase From Image and Diffraction Plane Pictures. *Optik (Stuttg).* 35, 237 (1972).

29. J. R. Fienup, Phase Retrieval Algorithms: A Comparison. *Appl. Opt.* 21, 2758–2769 (1982).

30. A. M. Maiden, J. M. Rodenburg, An Improved Ptychographical Phase Retrieval Algorithm for Diffractive Imaging. *Ultramicroscopy.* 109, 1256–1262 (2009).

31. L.-H. Yeh *et al.*, Experimental robustness of Fourier ptychography phase retrieval algorithms. *Opt. Express.* 23, 33214–33240 (2015).

32. J. Holloway et al., Toward Long-Distance Subdiffraction Imaging Using Coherent Camera Arrays. *IEEE Trans. Comput. Imaging.* 2, 251-265 (2016).

33. B. Salahieh, thesis, UNIVERSITY OF ARIZONA (2015).

34. S. Pacheco, G. Zheng, R. Liang, Reflective Fourier ptychography. *J. Biomed. Opt.* 21, 26010 (2016).

35. X. Ou, J. Chung, R. Horstmeyer, C. Yang, Aperture scanning Fourier ptychographic microscopy. *Biomed. Opt. Express.* 7, 3140-3150 (2016).

36. S. M. Beck et al., Synthetic-aperture imaging laser radar: laboratory demonstration and signal processing. *Appl. Opt.* 44, 7621-7629 (2005).

37. J. W. Goodman, *Introduction to Fourier optics* (Roberts and Company Publishers, 2005).

38. R. W. Gerchberg, Super-resolution Through Error Energy Reduction. *J. Mod. Opt.* 21, 709-720 (1974).

39. J. R. Fienup, Reconstruction of an Object From the Modulus of Its Fourier Transform. *Opt. Lett.* 3, 27-29 (1978).

40. J. M. Rodenburg, H. M. L. Faulkner, A phase retrieval algorithm for shifting illumination. *Appl. Phys. Lett.* 85, 4795-4797 (2004).

41. B. M. Oliver, Sparkling spots and random diffraction. *Proc. IEEE.* 51, 220-221 (1963).

42. J. D. Rigden, E. I. Gordon, The Granularity of Scattered Optical Maser Light. *Proc. IRE.* 50, 2367-2368 (1962).

43. J. C. Dainty, in *Berlin and New York, Springer-Verlag (Topics in Applied Physics. Volume 9), 1975. 298 p* (1975), vol. 9.

44. A. E. Ennos, in *Laser Speckle and Related Phenomena* (Springer Berlin Heidelberg, Berlin, Heidelberg, 1975; http://dx.doi.org/10.1007/BFb0111440), pp. 203–253.

45. T. S. McKechnie, Image-plane speckle in partially coherent illumination. *Opt. Quantum Electron.* 8, 61–67 (1976).

46. K. Dabov, A. Foi, V. Katkovnik, K. Egiazarian, Image Denoising by Sparse 3-D Transform-domain Collaborative Filtering. *Image Process. IEEE Trans.* 16, 2080–2095 (2007).

47. D. L. Donoho, J. M. Johnstone, Ideal spatial adaptation by wavelet shrinkage. *Biometrika.* 81, 425–455 (1994).

48. D. L. Donoho, I. M. Johnstone, Adapting to unknown smoothness via wavelet shrinkage. *J. Am. Stat. Assoc.* 90, 1200–1224 (1995).

49. V. Elser, Phase Retrieval by Iterated Projections. *JOSA A.* 20, 40–55 (2003).

50. Itseez, Open Source Computer Vision Library (2015).

51. S. Kubota, J. W. Goodman, Very efficient speckle contrast reduction realized by moving diffuser device. *Appl. Opt.* 49, 4385–4391 (2010).

52. J. M. Artigas, M. J. Buades, A. Felipe, Contrast sensitivity of the visual system in speckle imagery. *JOSA A.* 11, 2345–2349 (1994).

53. D. Gabor, others, A new microscopic principle. *Nature.* 161, 777–778 (1948).

54. M. K. Kim, Principles and techniques of digital holographic microscopy. *J. Photonics Energy*, 18005 (2010).

55. A. Papoulis, A New Algorithm in Spectral Analysis and Band-Limited Extrapolation. *Circuits Syst. IEEE Trans.* 22, 735–742 (1975).

56. A. Zomet, A. Rav-Acha, S. Peleg, in *Computer Vision and Pattern Recognition, 2001. CVPR 2001. Proceedings of the 2001 IEEE Computer Society Conference on* (2001), vol.

1, p. I--645.

57. T. Q. Pham, L. J. Van Vliet, K. Schutte, Robust Fusion of Irregularly Sampled Data Using Adaptive Normalized Convolution. *EURASIP J. Adv. Signal Process.* 2006, 1–12 (2006).

58. P. Vandewalle, S. Süsstrunk, M. Vetterli, A Frequency Domain Approach to Registration of Aliased Images with Application to Super-resolution. *EURASIP J. Adv. Signal Process.* 2006, 1–15 (2006).

59. A. I. Kirkland, W. O. Saxton, G. Chand, Multiple beam tilt microscopy for super resolved imaging. *J. Electron Microsc. (Tokyo).* 46, 11–22 (1997).

60. A. I. Kirkland, W. O. Saxton, K.-L. Chau, K. Tsuno, M. Kawasaki, Super-resolution by aperture synthesis: tilt series reconstruction in CTEM. *Ultramicroscopy.* 57, 355–374 (1995).

61. P. Li, T. B. Edo, J. M. Rodenburg, Ptychographic inversion via Wigner distribution deconvolution: noise suppression and probe design. *Ultramicroscopy.* 147, 106–113 (2014).

62. J. M. Rodenburg, R. H. T. Bates, The theory of super-resolution electron microscopy via Wigner-distribution deconvolution. *Philos. Trans. R. Soc. London A Math. Phys. Eng. Sci.* 339, 521–553 (1992).

63. R. Horstmeyer, C. Yang, A phase space model of Fourier ptychographic microscopy. *Opt. Express.* 22, 338 (2014).

64. R. Horstmeyer, R. Heintzmann, G. Popescu, L. Waller, C. Yang, Standardizing the resolution claims for coherent microscopy. *Nat. Photonics.* 10, 68–71 (2016).

We claim:

1. A method for imaging objects comprising the steps of:
providing an imaging device including a camera sensor, a camera lens, and a pupil;
illuminating an object with the light source;
receiving an illumination field reflected by the object, wherein an aperture field that intercepts the pupil of the imaging system is an optical propagation of the illumination field at an aperture plane;
receiving a portion of the aperture field onto a camera sensor;
receiving a sensor field of optical intensity on the image sensor, wherein the sensor field is a Fourier transform of the aperture field immediately after the camera lens;
iteratively centering the camera focus along the Fourier plane at different locations to produce a series of sensor fields;
stitching together the sensor fields in the Fourier domain to generate an image;
determining a plurality of phase information for each sensor field in the series of sensor fields; and
applying the plurality of phase information to the image;
receiving a plurality of illumination fields reflected by the object; and
denoising the intensity of plurality of illumination fields using Fourier ptychography.

2. The method of claim 1, wherein the optical propagation is one of a Fourier transform, a Fresnel transform, an angular spectrum propagation, and a Huygens convolution.

3. The method of claim 1, wherein the object includes an optically rough surface such that the illumination fields of the plurality of illumination fields are out of phase, creating speckle.

4. The method of claim 3, further comprising the step of utilizing Fourier ptychography to reduce speckle by increasing the aperture diameter.

5. The method of claim 3, further comprising the step of inserting a rotating diffuser in an optical path before the object to reduce speckle.

6. The method of claim 1, further comprising the step of generating a grid of images to yield a synthetic aperture.

7. The method of claim 6, wherein a synthetic aperture of at least 14.5 mm is generated.

8. The method of claim 1, including the steps of recording images with three different shutter times and joining the recorded images together to yield a high-dynamic range image.

9. The method of claim 1, wherein the step of determining a plurality of phase information for each sensor field comprises iteratively estimating the image intensity in the Fourier domain.

* * * * *